US 9,251,184 B2

(12) United States Patent
Harris

(10) Patent No.: US 9,251,184 B2
(45) Date of Patent: Feb. 2, 2016

(54) PROCESSING OF DESTRUCTIVE SCHEMA CHANGES IN DATABASE MANAGEMENT SYSTEMS

(75) Inventor: Simon D. Harris, Warwick (GB)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 12/986,305

(22) Filed: Jan. 7, 2011

(65) Prior Publication Data

US 2012/0179728 A1 Jul. 12, 2012

(51) Int. Cl.
*G06F 7/00* (2006.01)
*G06F 17/30* (2006.01)
*G06F 13/14* (2006.01)

(52) U.S. Cl.
CPC .................. *G06F 17/30297* (2013.01)

(58) Field of Classification Search
CPC .............. G06F 17/30607; G06F 17/30297; G06F 17/30604; G06F 17/30; G06F 17/30321; G06F 17/30336; G06F 17/30362; G06F 17/30171; G06F 17/30557; G06F 17/30289; G06F 17/30286; G06F 17/30292; G06F 17/30392
USPC ......... 707/601–602, 615, 674, 634, 769, 610, 707/648, 694, 704, 723, 802, 803, 999.102, 707/999.103, 999.104, E17.005, 999.1, 707/999.101, E17.01, E17.001, 609, 707/999.002
See application file for complete search history.

(56) References Cited

U.S. PATENT DOCUMENTS

| | | | |
|---|---|---|---|
| 6,571,260 B1* | 5/2003 | Morris ............... | G06F 12/0253 |
| 6,769,074 B2 | 7/2004 | Vaitzblit | |
| 6,944,615 B2 | 9/2005 | Teng et al. | |
| 7,634,510 B2* | 12/2009 | Marwah ............ | G06F 17/30312 |
| 2003/0126139 A1* | 7/2003 | Lee ...................... | G06F 17/2247 |
| 2005/0015377 A1* | 1/2005 | Wan ................................ | 707/10 |
| 2007/0271242 A1* | 11/2007 | Lindblad ........... | G06F 17/30923 |
| 2009/0198709 A1 | 8/2009 | Mishra et al. | |
| 2009/0216789 A1 | 8/2009 | Chowdhary et al. | |
| 2011/0078113 A1* | 3/2011 | Franz ............................ | 707/634 |
| 2011/0252002 A1* | 10/2011 | Ben-Dyke ......... | G06F 17/30297 707/661 |
| 2012/0246179 A1* | 9/2012 | Garza ............... | G06F 17/30297 707/752 |

* cited by examiner

*Primary Examiner* — Usmaan Saeed
*Assistant Examiner* — Cecile Vo
(74) *Attorney, Agent, or Firm* — Mohammed Kashef; SVL IPLaw Edell, Shapiro & Finnan, LLC

(57) ABSTRACT

Database schema changes are managed in a database management system by identifying and marking one or more database objects for a database schema change, identifying and processing accesses to identified database objects and storing information pertaining to the identified accesses, where the identified accesses are processed with respect to the database schema without the change, evaluating the stored information to determine a frequency with which identified objects are referenced by the identified accesses over a select time period, and implementing the database schema change in response to an indication that the frequency is below a threshold value.

14 Claims, 3 Drawing Sheets

| SCHEMA | TABLE_NAME | COLUMN_NAME | TYPE_NAME | PSEUDO-DROP |
|---|---|---|---|---|
| SIMON | ACCOUNTPROFILE | ADDRESS | VARCHAR | N |
| SIMON | ACCOUNTPROFILE | PASSWORD | VARCHAR | N |
| SIMON | ACCOUNTPROFILE | USERID | VARCHAR | N |
| SIMON | ACCOUNTPROFILE | EMAIL | VARCHAR | N |
| SIMON | ACCOUNTPROFILE | CREDITCARD | VARCHAR | N |
| SIMON | ACCOUNTPROFILE | FULLNAME | VARCHAR | Y |
| SIMON | ACCOUNTPROFILE | LASTNAME | VARCHAR | N |
| SIMON | ACCOUNTPROFILE | FIRSTNAME | VARCHAR | N |

FIG.2

PROCESSING OF DESTRUCTIVE SCHEMA CHANGES IN DATABASE MANAGEMENT SYSTEMS

BACKGROUND

1. Technical Field

The present invention relates to processing of schema changes within database management systems.

2. Discussion of the Related Art

Database management systems typically include information stored in some ordered configuration in one or more databases. For example, relational database management systems include data stored in tables, where database records are ordered in rows of the tables. Other types of database management systems include, without limitation, hierarchical based systems, such as an information management system (IMS) designed by IBM Corporation. Database schemas are provided by the database management systems to describe the organization of data and information within the databases. For example, in relational database management systems, database schemas are provided to describe the organization of data and information in tables, columns and fields within tables, indexes for the tables as well as relationships between the tables, columns and indexes. Database schemas are also provided for hierarchical based systems. A schema for a database management system in essence provides a blueprint or mapping of how the one or more databases are organized into various database organizational structures. The schema of a database management system can undergo changes for a number of different situations. For example, schema changes such as the addition or deletion of a column to a database table of a relational database management system may be necessary at times, depending upon changes in requirements to the types of data to be stored by the database management system.

Many schema changes to objects within database management systems are destructive and final. An example of a destructive schema change for a relational database management system is the dropping of a column from a database table. Such changes have a potential risk associated with them because applications which access the database management systems may still have an unknown dependency on the object that has been affected by the schema change. In addition, this dependency often remains unknown until the object affected by the schema change has been removed and errors are raised by the dependant application, which can result in costly downtime for the application.

An example approach to alleviating potential adverse affects of database schema changes would be to itemize every statement issued from every application that uses the database system. When a destructive schema change is necessary, the itemized statements can be analyzed and the impact the change will have on applications can be assessed before the change takes place. However, this approach becomes difficult due to the significantly large number of statements that would need to be itemized and kept up to date. This approach would further require some form of monitoring capability to record each and every statement, attempt to match each statement against already itemized statements, and to record the statement if it wasn't already itemized. In addition, such monitoring would need to be done for each and every application. The resulting performance overhead on applications for implementing this approach of gathering this data, and the administrative overhead of maintaining the data, renders this approach cost prohibitive.

A further drawback of to this approach is that it is only capable of detecting statements that directly reference an object to be removed. For example, this technique cannot easily detect dependencies on objects such as indexes, referential constraints, automatic summary tables, etc.

Consequently, destructive schema changes to a database are typically deferred by database administrators until there is a major re-design of an application. The undesirable result is that many redundant objects are maintained by the database management system, which in turn increases the total cost of ownership.

BRIEF SUMMARY

Accordingly, embodiments of the present invention include a method, a computer program product and a system for managing database schema changes in a database management system. Database schema changes are managed in the database management system by identifying and marking one or more database objects for a database schema change, identifying and processing accesses to identified database objects and storing information pertaining to the identified accesses, where the identified accesses are processed with respect to the database schema without the change, evaluating the stored information to determine a frequency with which identified objects are referenced by the identified accesses over a select time period, and implementing the database schema change in response to an indication that the frequency is below a threshold value.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 2 is a system catalog table including an indication of pseudo-dropped objects in accordance with an example embodiment of the present invention.

DETAILED DESCRIPTION

Figure 1:
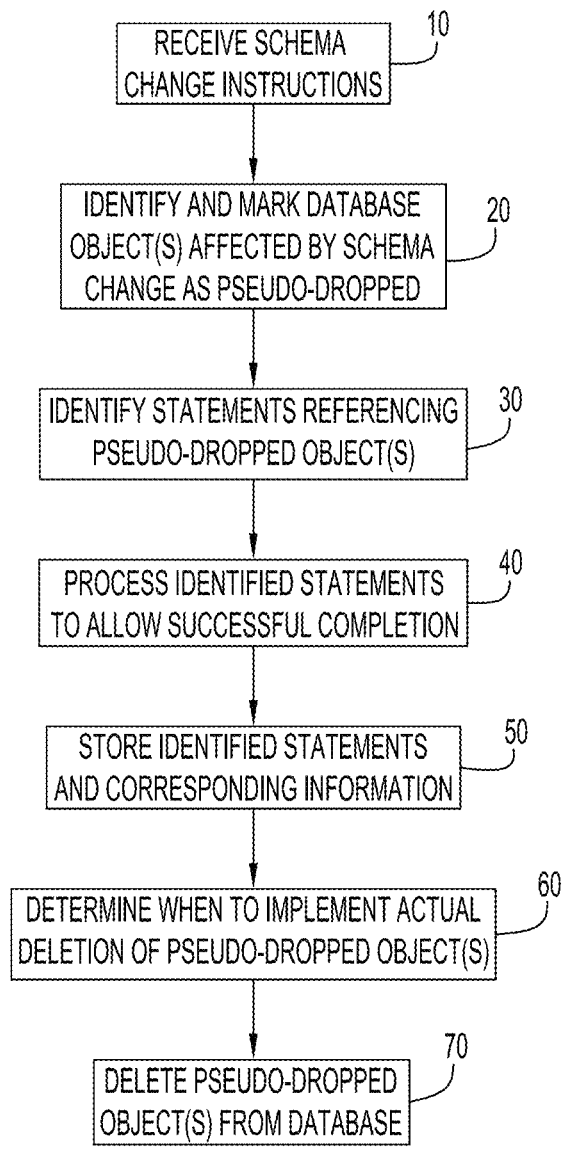
FIG. 1 provides a flowchart depicting an example method of processing a schema change in a database while permitting successful completion of statements that reference one or more objects dropped by the schema change according to an embodiment of the present invention.

In accordance with embodiments of the present invention, a method, system and computer program product are provided which minimize the potential impact of a destructive schema change involving the dropping of one or more objects from the database by marking any object affected by the schema change as pseudo-dropped over a select period of time and until it is determined that the frequency of references by client and/or any other applications to the affected object are minimal or substantially non-existent.

The present invention can be utilized in relation to a database schema change that results in the dropping of one or more objects of any one or more types including, without limitation, records, columns, views, tables, table indexes, triggers, stored procedures, packages, and referential integrity constraints. The present invention can further be applied to relational database management systems that utilize tables and columns to organize data and also other types of database management systems such as database management systems that organize data in a hierarchical organizational structure (such as IMS systems).

A destructive schema change involving the dropping of one or more objects from a database management system is marked or flagged by the system as having occurred without actually being performed on the system. In particular, the marking or flagging occurs by marking any one or more objects that are affected by the schema change as being "pseudo-dropped". In other words, the affected objects are not immediately dropped by the database management system after receiving a destructive schema change but instead are marked as pseudo-dropped. Any subsequent statement by an application interacting with the database management system which references (either directly or indirectly) a pseudo-dropped object will be allowed to complete successfully by continuing to reference the pseudo-dropped object. Such statements are recorded by the database management system, so as to generate a log that identifies information about how often a pseudo-dropped object is referenced during periods of access of the database management system, specific applications and statements that are referencing the pseudo-dropped object, etc.

The pseudo-drop marking of objects affected by destructive schema changes allows applications with previously undetected dependencies to such objects to continue to operate in a normal manner and also provide database administrators with information that identifies such dependencies in order to correct these dependencies over a select time period. When a determination has been made that there are no further dependencies on a pseudo-dropped object (e.g., the frequency of references to a pseudo-dropped object decreases to zero or is no greater than a threshold value over a select time period), the drop will be made permanent with removal of the pseudo-dropped object from the database(s) of the database management system.

An example embodiment is now described with reference to the flowchart of FIG. 1 and the table shown in FIG. 2. A database management system receives an instruction for a schema change (step 10) from a user having authority to make such a schema change (e.g., a database administrator). The schema change is destructive in that it will result in the dropping of one or more objects from database tables of the database management system. As noted above, the objects to be dropped can be of any of the previously noted types.

The database management system identifies and marks as "pseudo-drop" any and all database objects that are affected by the schema change in that they are to be dropped or deleted from one or more databases (step 20). In particular, an object can be marked as being pseudo-dropped in the form of metadata for a database catalog that includes the object to be dropped.

An example embodiment of such marking is shown in FIG. 2. In this example, a database catalog table for a relational database management system is modified by the system to show the effects of a schema change on an object of a database table identified as ACCOUNTPROFILE (as shown in the TABLE_NAME column of the table). The database catalog table includes a SCHEMA column, which identifies the schema (SIMON) of the changed object. The database catalog table further includes information regarding each column of the table (COLUMN_NAME), the type of data (e.g., VARCHAR) that is in each column (TYPE_NAME), and information regarding whether a column in this database table has been pseudo-dropped (PSEUDO_DROP). In this example, the FULLNAME column has been pseudo-dropped as a result of the schema change in the database table ACCOUNTPROFILE.

Upon identifying and marking all database objects affected by the schema change as pseudo-dropped, the database management system allows statements from client and/or any other applications which reference pseudo-dropped objects to proceed to completion while identifying and logging such statements. In particular, the database management system identifies each statement that references, either directly or indirectly, a pseudo-dropped object (step 30). Each of those statements which are identified as referencing pseudo-dropped objects are allowed to process to successful completion of the statement (step 40). Utilizing the example embodiment of the ACCOUNTPROFILE table of FIG. 2, assume a statement from a client application (e.g., a data query such as an SQL statement) references data in the FULLNAME column for a database record in the ACCOUNTPROFILE database. The database management system permits the client application to process to completion of the statement without an error and utilizing the pseudo-dropped object as necessary based upon the requirements of the statement (e.g., allowing a data query referencing a pseudo-dropped object to proceed with the requested data, utilizing the pseudo-dropped object as necessary to process the statement, from the database table being provided to the client application). Direct reference to a pseudo-dropped object will be apparent from the statement itself. However, by allowing processing of the statement to completion, a determination can also be made regarding whether any pseudo-dropped objects are indirectly referenced by the statement. In other words, a pseudo-dropped object may not be expressly referenced in the statement but may be indirectly referenced due to an operation that is required to process the statement to completion. Thus, allowing the identified statement to process to completion will ensure monitoring and identification of all pseudo-dropped objects (direct and indirect) referenced by the identified statement.

The database management system stores statements identified as referencing (directly or indirectly) pseudo-dropped objects as well as other corresponding information (step 50) so as to provide a record or log of how often, which types of statements and/or which applications are continuing to reference pseudo-dropped objects. Examples of types of information that are recorded or logged for each statement referencing a pseudo-dropped object include, without limitation, each object name (fully qualified name of the object) that has been pseudo-dropped and referenced (directly or indirectly) by the statement, the complete text of the statement that references (directly or indirectly) the pseudo-dropped object, number of times reference to each pseudo-dropped object occurs over a select time period, any information that identifies a client issuing a statement (e.g., an issuing userid, client host name, client IP address, etc.), and any information that identifies the application (e.g., application name).

The statement log or record can be monitored to determine when to actually implement a deletion of pseudo-dropped objects (step 60). In particular, the information in the statement log can be utilized to track how often a particular pseudo-dropped object has been referenced in statements, as well as the frequency with which client and/or any other applications reference the pseudo-dropped object, thus rendering the task of identifying and modifying offending applications much easier. For example, the statement log provides information regarding which applications should be corrected or modified to prevent statements that reference (or continue to reference) pseudo-dropped objects when an application accesses the database management system. After a certain period of time, and based upon the information collected in the statement log, it can be determined that there is a strong likelihood that a particular pseudo-dropped object will no longer be referenced (e.g., due to corrections/modifications to offending applications to ensure that there are substantially no applications that reference or continue to reference pseudo-dropped objects, a diminished frequency of reference to the pseudo-dropped object to zero or some minimum threshold value and/or any other factors which satisfy a confidence threshold that all actual and/or potential violating applications have been corrected). The monitoring of the statement log or record can be done manually, where a database administrator periodically checks the statement log. Alternatively, the monitoring process could be automated by the database management system (so as to alleviate any burden on a database administrator) utilizing a suitable algorithm to determine, based upon data within the statement log, the likelihood or probability that a pseudo-drop object may be referenced in a statement by an application is below a threshold value (e.g., when the number of times the pseudo-drop object has been referenced in a select time period has dropped below a certain value, the system automatically determines the pseudo-drop object can actually be deleted).

Each pseudo-dropped object can be deleted from the database management system (step 70) when it is determined that such object is not likely to be referenced in a statement (i.e., the determination made in step 60). The actual deletion of each pseudo-dropped object from the database management system can occur manually (e.g., by a database administrator) or automatically by the system. Thus, the present invention allows for the eventual permanent removal and deletion of the pseudo-dropped objects, which benefits the database management system (e.g., by facilitating reclamation of memory space), while ensuring that there are zero or a minimal number of client and/or any other applications that will continue to reference the removed and deleted objects.

Additional features of the present invention include, without limitation, providing a warning notification, an error notification and/or any other suitable communication to applications when a statement references an object marked as pseudo-drop. A notification (e.g., an email) could also be provided to a database administrator or other personnel of the database management system each time a statement is received that references a pseudo-dropped object. Any other suitable features that enhance the ability to identify and mark objects to be pseudo-dropped and deleted as a result of a schema change as well as identify possible statements by applications that might reference the pseudo-dropped objects can be implemented to ensure an easy and successful implementation of the schema change.

The previous method was described with reference to the pseudo-dropping of a database column for a relational database management system such as shown in the embodiment of FIG. 2. However, as noted above, the present invention is applicable to any one or more types of objects that can be dropped and deleted as a result of a schema change implemented for any suitable type of database management system. In another example embodiment, a schema change can be made to pseudo-drop an index from a database table, where a determination is made that this index is no longer required. In this scenario, it can be difficult to determine for certain whether the index to be deleted is no longer required by every application accessing the database management system. Thus, removing the index according to the schema change without applying the pseudo-drop mechanism of the present invention could negatively impact one or more applications that might still utilize this index. By first marking the index as a pseudo-dropped object, and also identifying incoming statements to the database management system that reference pseudo-dropped objects for a select time period, a determination can be made regarding the importance of this index prior to implementing a permanent deletion of this index. If there is at least one statement that references this index, this provides an indication that the index may not be redundant.

In addition, the present invention further provides information to determine when a schema change results in the pseudo-dropping of an object that is frequently used (e.g., the frequency of use is above a threshold value for a select time period) by a select number of applications. In such a situation, a determination may be made that the pseudo-dropped object should be maintained within the database and the schema change should be modified so as to not affect this object.

The methods described above and depicted in the flowchart of FIG. 1 can be implemented utilizing any suitable system including hardware and software implemented in a single module or unit or, alternatively, implemented as two or more separate units. An example embodiment of a system for implementing the methods described above is schematically depicted in FIG. 3. In particular, system 200 includes a database management system or DBMS 202 (e.g., a relational database management system) including a server 204. The DBMS server 204 includes a CPU and facilitates operations including, without limitation, processing of schema changes, and retrieval, insertion and deletion of records within the DBMS 202 in response to queries (e.g., SQL statements), insert and other statements. The DBMS server 204 is further configured with suitable logic to implement the previously described methods of marking pseudo-dropped objects that are affected by a schema change, to identify and monitor statements by client and/or any other applications that reference such pseudo-dropped objects, and to further permanently remove/delete the pseudo-dropped objects or process the objects in any other suitable manner. The DBMS can further include any suitable number of databases that are coupled via any suitable network with the DBMS server 204 to facilitate access, retrieval, insertion, deletion and changing of data by the DBMS server 204 as well as other processing operations necessary to facilitate administration and operation of the DBMS 202.

Figure 3:
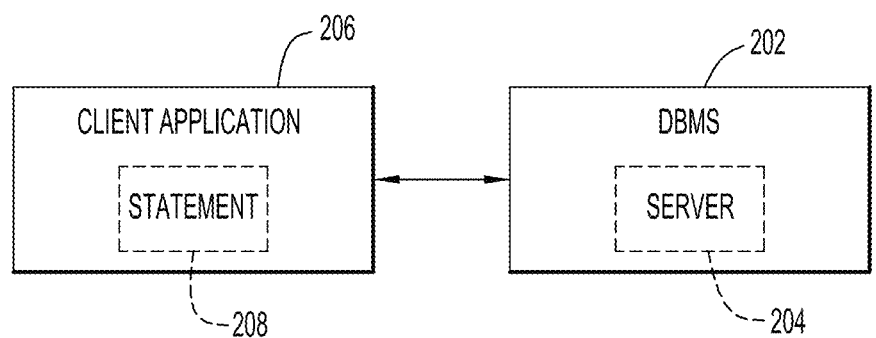
FIG. 3 is a block diagram illustrating an example embodiment of a database management system for practicing the method of FIG. 1 in accordance with the present invention.

The DBMS 202 communicates with applications (e.g., a client application 206 as shown in FIG. 3) to receive statements (e.g., statement 208 as shown in FIG. 3) via any suitable connection including, without limitation, via direct data entry into a peripheral coupled with the DBMS 202, via cloud computing, via network computing in which the DBMS 202 is operatively coupled to one or more other servers, via any suitable computer readable storage medium that includes record information (e.g., magnetic, optical, floppy, DVD, CD, other non-transitory medium, etc.), and via any suitable type of carrier wave or signal for downloading from a source via a communication medium (e.g., bulletin board, network, LAN, WAN, Intranet, Internet, etc.).

The DBMS, DBMS server and applications (e.g., modules including such applications) accessing the DBMS can be any suitable computer systems implemented by any type of hardware and/or other processing circuitry. In particular, the DBMS, DBMS and applications may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Droid, iPhone, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information. In addition, record information may be received by the server and retained by the database in any suitable manner, such as the types described above.

In operation, the DBMS server 204 is utilized to implement the method steps as set forth in the flowchart of FIG. 1. The DBMS server 204 receives schema change instructions (e.g., via input by a database administrator) and identifies and marks all database objects that are to be dropped/deleted as a result of the schema change with a pseudo-drop designation. The DBMS server 204 further identifies incoming statements 208 from client applications 206 (or other types of applications) that reference pseudo-dropped objects while successfully processing such statements. The identified statements, as well as other information associated with such statements (e.g., information as noted above) are stored in a statement record or log within the DBMS 202. A determination (e.g., an automatic determination by the DBMS server 204 or, alternatively a manual determination by a database administrator) is made regarding when is the appropriate time to implement actual deletion of the pseudo-dropped objects in accordance with suitable criteria (e.g., previously noted criteria), and such deletion is implemented (either automatically by the DBMS server 204 or manually by a database administrator).

Thus, the example system and methods described above facilitate processing of destructive schema changes by pseudo-dropping of objects affected by the schema changes while not actually implementing the changes until a determination is made that the impact of the deletion of such objections is minimal to applications accessing the database management system. The processing in this manner does not require that all incoming statements be processed but only those that reference (directly or indirectly) any pseudo-dropped object. This reduces the administrative overhead as well as the memory space that would otherwise be required to log and review every statement. Furthermore, by pseudo-dropping the objects associated with the schema change and allowing subsequent statements to process to completion, both direct and indirect reference to objects by such statements can be determined. This is a significant advantage to simply reviewing a statement to determine whether a direct object is referenced in the statement, but without determining whether an object is indirectly referenced (since this would require processing of the statement).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of managing database schema changes in a database management system comprising:

identifying and marking one or more database objects for deletion from the database management system, in response to a destructive database schema change indicating permanent deletion, wherein the one or more marked database objects are accessible by applications referencing the one or more marked database objects, and metadata associated with the one or more database objects indicates that the one or more database objects are marked for deletion;

identifying accesses to the one or more marked database objects by one or more applications referencing the one or more marked database objects, storing information pertaining to the identified accesses, and processing the identified accesses by the one or more applications without deletion of the one or more marked database objects;

modifying the identified accesses by the one or more applications so that the one or more applications no longer reference the one or more marked database objects;

evaluating the stored information to determine a frequency with which the one or more marked database objects are referenced by the identified accesses over a select time period; and implementing the destructive database schema change by permanent deletion of the one or more marked database objects in response to an indication that the frequency with which the one or more marked database objects are referenced is below a threshold value for the select time period.

2. The method of claim 1, wherein the frequency is below the threshold value when substantially all identified accesses that reference the one or more marked database objects have been modified.

3. The method of claim 1, wherein the identified accesses comprise incoming statements from applications accessing the database management system.

4. The method of claim 1, wherein at least one marked database object is indirectly referenced by an identified access.

5. The method of claim 1, wherein the one or more marked database objects comprise at least one of a record, a column, a view, a table, a table index, a trigger, a stored procedure, a package, and a referential integrity constraint.

6. The method of claim 1, wherein the metadata includes a column corresponding to a status of whether each object of the one or more database objects is marked as pseudo-dropped.

7. A database management system for managing database schema changes, the system comprising:

a server configured to access one or more databases based upon access requests by applications, the server comprising a processor configured with logic to:

identify and mark one or more database objects for deletion within the one or more databases, in response to a destructive database schema change indicating permanent deletion, wherein the one or more marked database objects are accessible by applications referencing the one or more marked database objects, and metadata associated with the one or more database objects indicates that the one or more database objects are marked for deletion;

identify accesses to the one or more marked database objects by one or more applications referencing the one or more marked database objects, store information pertaining to the identified accesses, and processing the identified accesses by the one or more applications without deletion of the one or more marked database objects;

modify the identified accesses by the one or more applications so that the one or more applications no longer reference the one or more marked database objects;

evaluate the stored information to determine a frequency with which the one or more marked database objects are referenced by the identified accesses over a select time period; and implement the destructive database schema change by permanent deletion of the one or more marked database objects in response to an indication that the frequency with which the one or more marked database objects are referenced is below a threshold value for the select time period.

8. The database management system of claim 7, wherein the frequency is below the threshold value when substantially all identified accesses that reference the one or more marked database objects have been modified.

9. The database management system of claim 7, wherein at least one marked database object is indirectly referenced by an identified access.

10. The database management system of claim 7, wherein the one or more marked database objects comprise at least one of a record, a column, a view, a table, a table index, a trigger, a stored procedure, a package, and a referential integrity constraint.

11. A computer program product for managing database schema changes in a database management system comprising:

a computer readable storage medium having computer readable program code embodied therewith, the computer readable program code configured to:

identify and mark one or more database objects for deletion from the database management system, within the one or more databases in response to a destructive database schema change indicating permanent deletion, wherein the one or more marked database objects are accessible by applications referencing the one or more marked database objects, and metadata associated with the one or more marked database objects indicates that the one or more database objects are marked for deletion;

identify accesses to the one or more marked database objects by one or more applications referencing the one or more marked database objects, store information pertaining to the identified accesses, and processing the identified accesses by the one or more applications without deletion of the one or more marked database objects;

modifying the identified accesses by the one or more applications so that the one or more applications no longer reference the one or more marked database objects;

evaluate the stored information to determine a frequency with which the one or more marked database objects are referenced by the identified accesses over a select time period; and implement the destructive database schema change by permanent deletion of the one or more marked database objects in response to an indication that the frequency with which the one or more marked database objects are referenced is below a threshold value for the select time period.

12. The computer program product of claim 11, wherein the frequency is below the threshold value when substantially all identified accesses that reference the one or more marked database objects have been modified.

13. The computer program product of claim 11, wherein at least one marked database object is indirectly referenced by an identified access.

14. The computer program product of claim 11, wherein the one or more marked database objects comprise at least one of a record, a column, a view, a table, a table index, a trigger, a stored procedure, a package, and a referential integrity constraint.

* * * * *